United States Patent [19]

Tults

[11] Patent Number: 5,436,668
[45] Date of Patent: Jul. 25, 1995

[54] HORIZONTAL LINE COUNTER STABILIZATION IN A VIDEO RECEIVER

[75] Inventor: Juri Tults, Indianapolis, Ind.

[73] Assignee: Thomson Consumer Electronics, Inc., Indianapolis, Ind.

[21] Appl. No.: 295,330

[22] Filed: Aug. 24, 1994

Related U.S. Application Data

[63] Continuation of Ser. No. 142,420, Nov. 22, 1993, abandoned.

[30] Foreign Application Priority Data

Jul. 2, 1991 [GB] United Kingdom ............. 9114248

[51] Int. Cl.⁶ ........................................... H04N 5/04
[52] U.S. Cl. .................................. 348/536; 348/540; 348/547
[58] Field of Search ............. 348/536, 540, 546–548, 348/497; H04N 5/04

[56] References Cited

U.S. PATENT DOCUMENTS

| | | | |
|---|---|---|---|
| 4,160,993 | 7/1979 | Merrell | 358/21 V |
| 4,170,026 | 10/1979 | Nagaoka et al. | 358/188 |
| 4,198,651 | 4/1980 | Barton et al. | 358/21 V |
| 4,224,639 | 9/1980 | Belisomi | 348/548 |
| 4,227,214 | 10/1980 | Morito et al. | 358/148 |
| 4,616,259 | 10/1986 | Moran et al. | 348/536 X |
| 4,954,893 | 9/1990 | Urakami | 348/547 |
| 5,138,451 | 8/1992 | Shinkawa et al. | 348/536 X |
| 5,251,015 | 10/1993 | Rumreich . | |

*Primary Examiner*—Victor R. Kostak
*Attorney, Agent, or Firm*—Joseph S. Tripoli; Peter M. Emanuel; Robert D. Shedd

[57] ABSTRACT

In a system for identifying specific horizontal lines of video that are included in a video signal, a horizontal line counter (100) is cleared to indicate the beginning of a vertical interval by a reset signal (VERDEL) derived from a vertical sync signal (VER). The line counter is clocked by a signal (HOR) at the horizontal sync rate that is derived from a harmonic (N_FH) of the horizontal sync signal. The relative phase shift between the reset and clock signals for the horizontal line counter is measured (105,120). The measured phase shift is used as an input to a variable phase shifter (110) to adjust the phasing between the horizontal line counter control signals and the original sync signals. The phase adjustment permits significantly decreasing the sensitivity of the horizontal line counter to jitter of vertical sync.

15 Claims, 4 Drawing Sheets

HORIZONTAL LINE COUNTER STABILIZATION IN A VIDEO RECEIVER

This is a continuation of application Ser. No. 08/142,420, filed Nov. 22, 1993, now abandoned.

FIELD OF THE INVENTION

The present invention relates to detection of information that may be present in a video signal during vertical blanking intervals.

BACKGROUND OF THE INVENTION

A video signal typically includes vertical display intervals that comprise a plurality of horizontal line intervals, e.g. 525 lines per vertical interval in NTSC video systems. A portion of each vertical interval is usually designated as a vertical blanking interval. The vertical blanking interval may span a plurality of horizontal line intervals, e.g. in excess of 20 horizontal line intervals. The beginning of each vertical and horizontal interval is identified by respective vertical and horizontal sync pulses that are included in a composite video signal.

The content of the video signal during blanking intervals is usually not intended for display as part of the normal video image. The lack of image information in blanking intervals makes it possible to insert auxiliary information, e.g. teletext and closed caption data, into blanking intervals. The standards for each type of auxiliary information specify the positioning of the information within a vertical blanking interval. For example, the present closed captioning standard (see e.g., 47 CFR §§15.119 and 73.682) specifies that digital data corresponding to ASCII characters for closed captioning must be in line 21 of vertical blanking.

An approach to recovery of auxiliary information is to accurately identify a specific line interval, e.g. line 21, containing auxiliary information during a vertical blanking interval by counting horizontal sync pulses. For example, a horizontal line counter could be initialized by a vertical sync pulse and clocked by horizontal sync pulses. Ideally, the count value would then represent the line number. However, in a non-ideal environment, e.g. a television receiver chassis, the described simplistic line-counter approach may be unreliable. As an example, noise introduced by deflection circuits related to image display apparatus, e.g. a cathode ray tube (CRT), and temperature effects may produce varying timing relationships, e.g. time delays or jitter, between versions of horizontal and vertical sync that might be used to control a horizontal line counter. Jitter in combination with any delay between horizontal and vertical sync may introduce a critical race condition between initialization of a horizontal line counter by vertical sync and clocking of the line counter by horizontal sync. A critical race condition may cause the line count to be incorrect and unpredictable. For example, in one field the count value may correctly identify line 21 while in another field the count value may be 22 when line 21 is actually being received. Thus, the described approach may not reliably identify a particular horizontal line as desired for the purpose of extracting auxiliary data from a video signal.

The described potential for line count error is particularly significant in regard to closed caption decoders that are included internal to a television receiver. Set-top decoders are external to the receiver chassis and may not exhibit the above-described noise and temperature problems. Graphics systems, e.g. on-screen display (OSD), may involve line number identification. However, minor line count errors, such as the above-described error of 1, may produce only minor shifts of an OSD image, not data loss. Line count errors of 1 will result in a loss of closed caption data because the data appears during line 21 only. Frequent line count errors may produce an unacceptable degree of closed caption data loss.

SUMMARY OF THE INVENTION

In accordance with a feature of the present invention, a horizontal line counter is cleared to indicate the beginning of a vertical interval by a reset signal derived from a vertical sync signal. The line counter is clocked by a signal at the horizontal sync rate that is derived from a harmonic of the horizontal sync signal. The relative phase shift between the reset and clock signals for the horizontal line counter is measured. The measured phase shift is used as an input to a variable phase shifter to adjust the phasing between the horizontal line counter control signals and the original sync signals. The phase adjustment advantageously decreases the sensitivity of the horizontal line counter to unstable phase shifts, e.g. jitter, between horizontal and vertical sync signals.

DETAILED DESCRIPTION OF THE DRAWING

Figure 1:
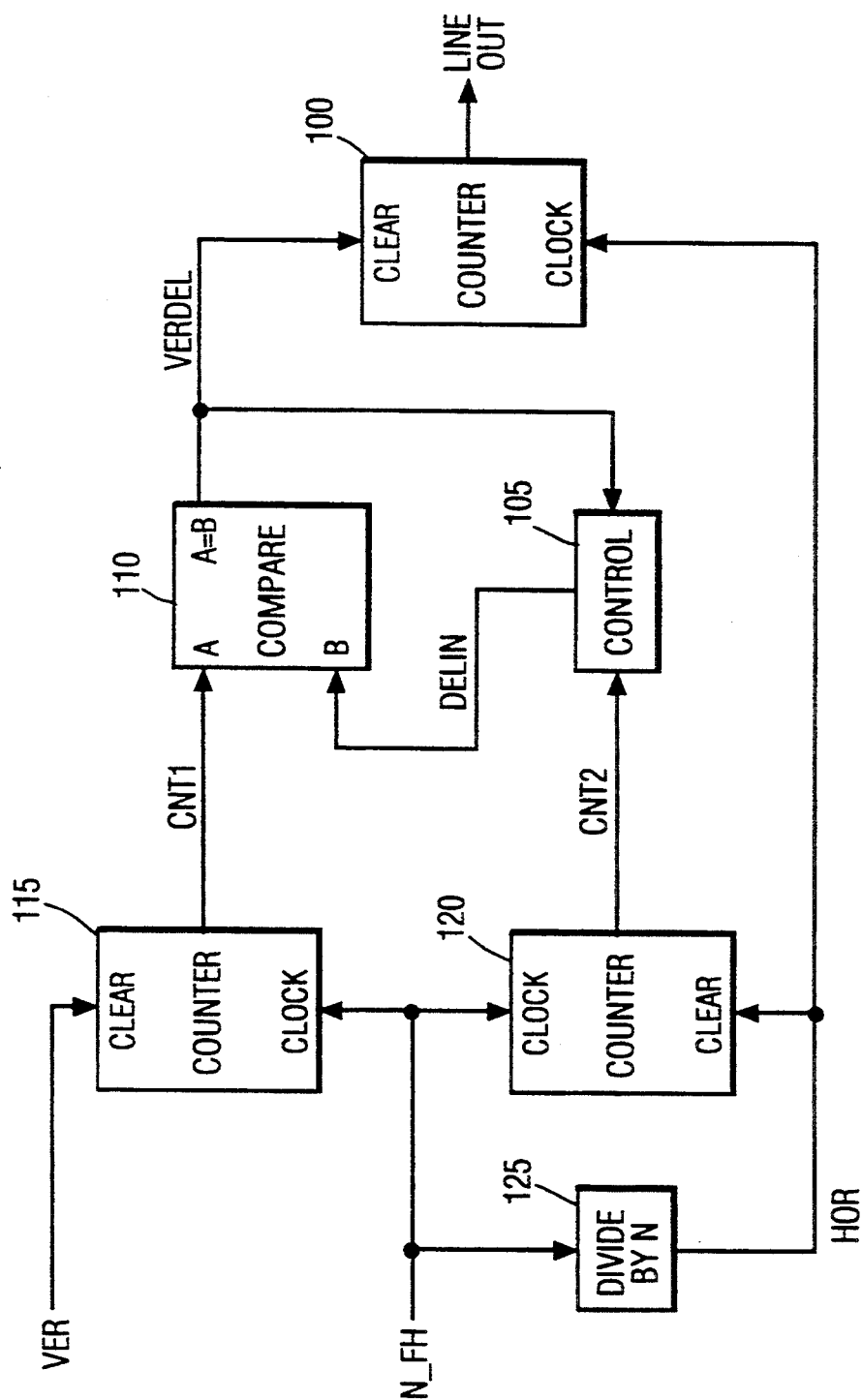
FIG. 1 shows in block diagram form an embodiment of the invention.

In FIG. 1, vertical sync signal VER is coupled to the CLEAR input of counter 115 to clear or zero the value of counter 115 in response to the occurrence of a vertical sync pulse. Counter 115 is clocked by a harmonic N_FH of horizontal sync frequency FH where the "N" prefix in the designation N_FH indicates the particular harmonic of signal FH. For example, N may have a value of 16 indicating that the frequency of signal N_FH is 16 times that of horizontal sync frequency FH. Signal N_FH may be present in a video receiver in regard to other functions, e.g. on-screen display (OSD) or closed caption signal processing functions. Alternatively, signal N_FH might be generated from a crystal controlled signal source including a phase locked loop (PLL) that is locked to the horizontal frequency FH. The output of counter 115 is count value CNT1 that represents the number of cycles of signal N_FH that occur after a particular transition, e.g. logic 0 to logic 1, of signal VER.

Signal N_FH is divided by N in divider 125 to produce signal HOR having a frequency equal to that of horizontal sync. Signal HOR is coupled to the CLEAR input of counter 120 and to the clock input of horizontal line counter 100. Counter 120 is reset by signal HOR and clocked by signal N_FH to count upward from 0 to N, thus producing a count value CNT2 that represents the number of cycles of N_FH that occur after a pulse on signal HOR. As explained further below, count value CNT2 also represents the relative delay between signal HOR and signal VERDEL (a delayed version of signal VER).

Comparator 110 compares count value CNT1 with a delay value DELIN from control unit 105. The output of comparator 110 is signal VERDEL that indicates when CNT1 is equal to delay value DELIN. The occurrence of signal VERDEL indicates that the specified delay DELIN has elapsed after the occurrence of a pulse on signal VER and that counting of horizontal lines should begin. Thus, horizontal line counter 100 is initialized or cleared in response to signal VERDEL. Clocking for line counter 100 is provided by signal HOR.

Signal VERDEL is derived from vertical sync signal VER. Jitter on signal VER may cause corresponding variations in the time at which pulses on signal VERDEL occur with respect to pulses on signal HOR. If the edges of pulses on signals HOR and VER are closely aligned (near zero delay), a critical race condition may exist between the clock and clear inputs of line counter 100, signals HOR and VERDEL respectively. The critical race condition may undesirably permit jitter on signal VER to cause signal HOR to clock line counter 100 in an indeterminate manner. For example, the described critical race condition may result in a clock pulse to counter 100 that occurs either immediately before or immediately after the clearing of counter 100 by signal VERDEL. As a result, the line count may be incorrect and unpredictable.

However, signal VERDEL also causes control unit 105 to read count value CNT2 from counter 120. As described below, control unit 105 uses count value CNT2 to adjust delay value DELIN. The adjustment of delay value DELIN positions pulses on signal VERDEL with respect to pulses on signal HOR to decrease the sensitivity of horizontal line counter 100 to jitter in vertical sync signal VER. As a result, the reliability of line counter 100 is significantly improved.

Desirable values for delay value DELIN depend on the format of the video signal involved. Near zero delay between vertical and horizontal sync introduces the greatest potential for signal jitter to cause a critical race between signals VERDEL and HOR at the control inputs of the horizontal line counter. Delaying signal VERDEL by 0.5 times the horizontal line period would appear to place the greatest time spacing between the edges of signals VERDEL and HOR and minimize the possibility of a critical race. However, the timing between fields of video information in a video signal like an NTSC standard signal makes the choice of a 0.5 line period delay undesirable.

More specifically, an NTSC video signal includes two interlaced fields of video image data in each frame. Each field begins with vertical sync and includes 262.5 horizontal lines. Shifting signal VERDEL in field 1 by one-half line period with respect to signal HOR to minimize jitter insensitivity in field 1 would cause signal VERDEL in field 2 to have substantially zero delay with respect to signal HOR in field 2. As a result, a 0.5 line period delay could cause rather than prevent critical timing problems.

Figure 2:
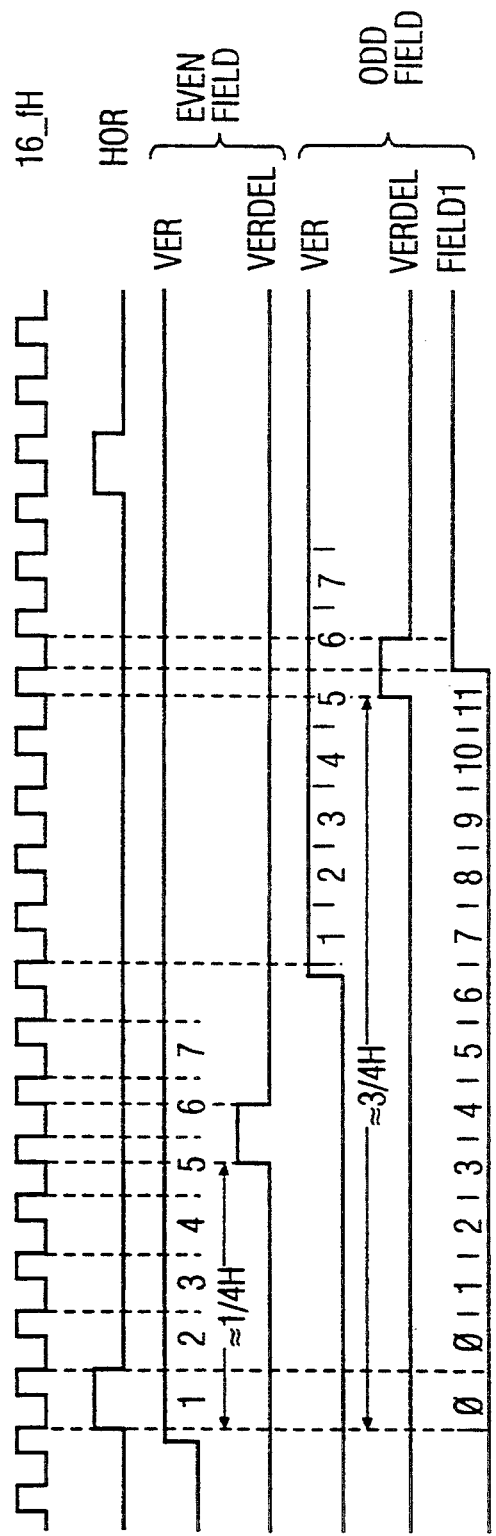
FIG. 2 shows signal waveforms useful for understanding the operation of the embodiment in FIG. 1.

A desirable choice of delay between vertical and horizontal sync signals at the horizontal line counter inputs is 0.25 or 0.75 times the value of the horizontal line period. Selecting either of these values provides a spacing of 0.25 line period (16 us for NTSC) between signals VERDEL and HOR in both fields 1 and 2. This timing situation is shown in FIG. 2.

As an example of the operation of the embodiment in FIG. 1, consider the case of an NTSC video signal having horizontal line periods of approximately 64 us. The value of N may be chosen to be 16 as shown in FIG. 2 resulting in 16 cycles of N_FH (each cycle having a period of 4 us) during each horizontal line interval. The choice of 16 as the value of N may be advantageous because counters 115 and 120 may then be selected to be common 4-bit digital counters. For N equal to 16, the desirable delay values of 0.25 or 0.75 times the horizontal period translate into 4 or 12 periods of signal N_FH.

Figure 3:
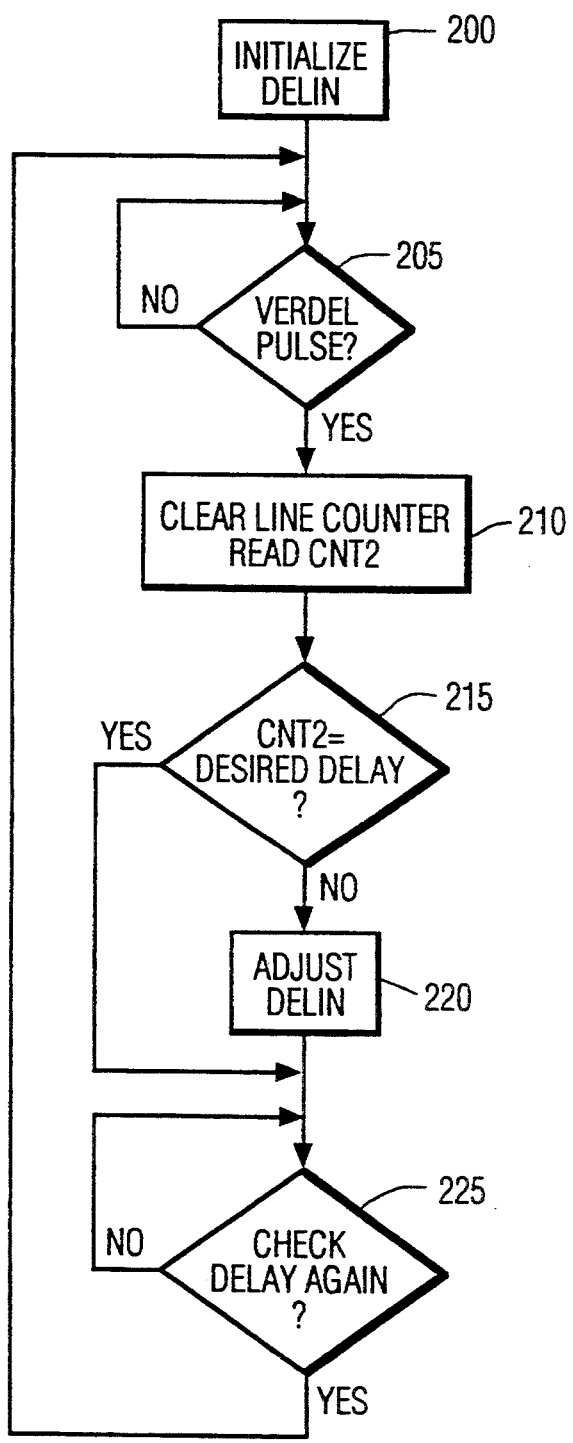
FIG. 3 shows a flow chart useful for understanding the operation of the embodiment in FIG. 1.

The flowchart in FIG. 3 further explains the operation of the embodiment in FIG. 1 and, in particular, the operation of control unit 105. At step 200 in FIG. 3, control unit 105 initially establishes a low delay value DELIN, e.g. 4 us (a count of one). Control unit 105 then waits (step 205) for the occurrence of a transition, e.g. a transition from logic 0 to logic 1, on signal VERDEL indicating that count value CNT1 equals delay value DELIN. When count value CNT1 equals delay value DELIN, a delay equal to the period of N_FH times delay value DELIN has elapsed after an occurrence of a pulse on signal VER. The occurrence of a transition on signal VERDEL also clears horizontal line counter 100 and causes control unit 105 to read count value CNT2 (step 210). Count value CNT2 indicates the relative delay between pulses on signals HOR and VERDEL because: 1) both counters 115 and 120 are clocked by the same signal N_FH, 2) count value CNT2 is initialized when a pulse occurs on signal HOR, and 3) count value CNT2 is checked by control unit 105 when a pulse occurs on signal VERDEL. The delay indicated by count value CNT2 is in terms of the number of cycles of signal N_FH that have occurred since counter 120 was cleared by a pulse on signal HOR.

At step 215, control unit 105 compares the relative delay between signals VERDEL and HOR as indicated by count value CNT2 with a desired delay, e.g. 4 or 12 cycles of signal 16_FH. For example, count value CNT2 may be subtracted from a desired delay DELDES to produce a delay error DELTA1. Control unit 105 then adjusts (step 220) the value of delay value DELIN to more closely approximate the desired delay between signals HOR and VERDEL. The adjustment may be accomplished by, for example, adding the delay error DELTA1 to the present delay value DELIN to produce a new value for delay DELIN. The control operation then waits (step 225) until the delay value is to be checked again at which time the described operation is repeated. The delay value may be checked, for example, every field or less frequently.

Figure 4:
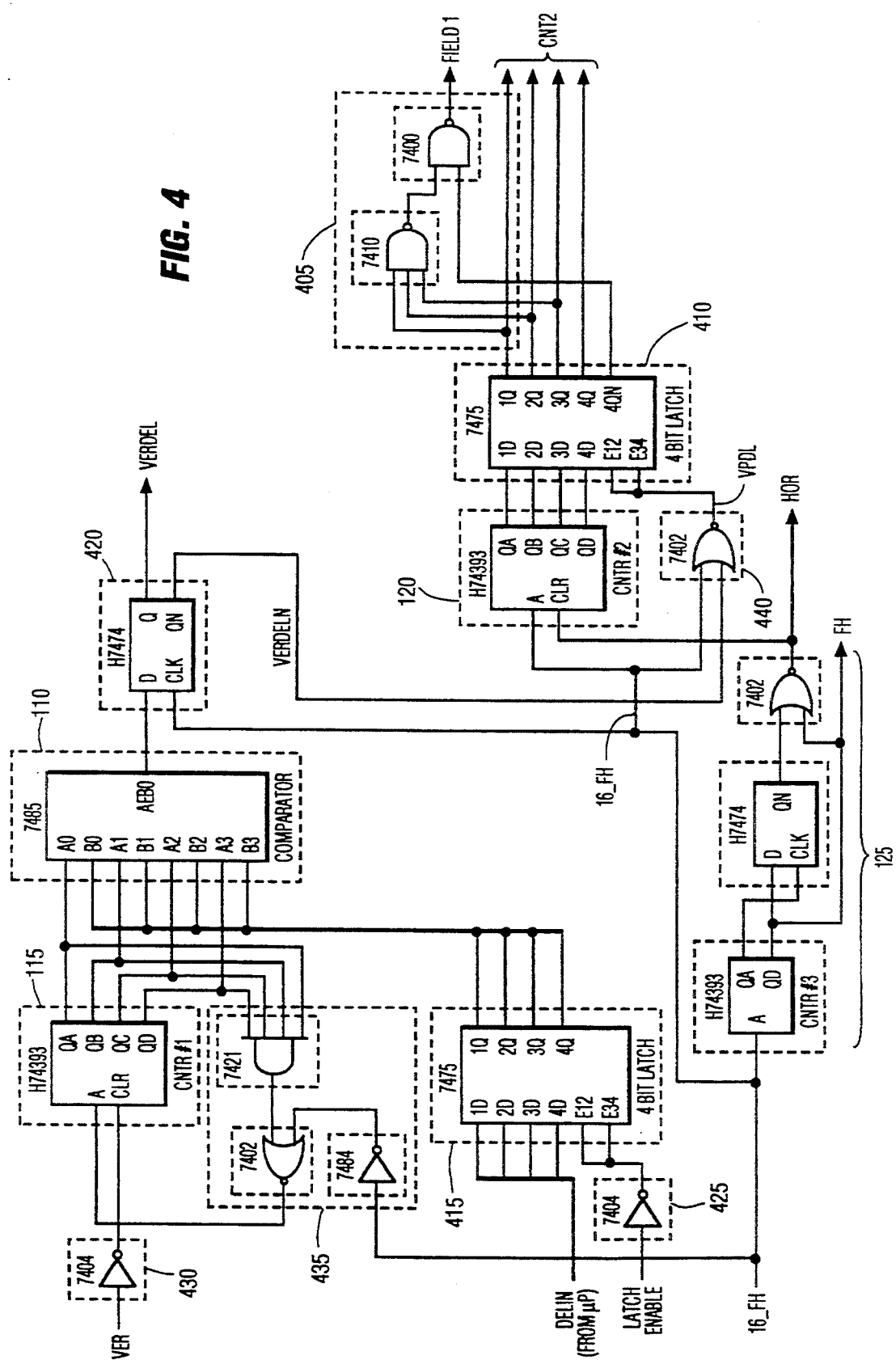
FIG. 4 shows a digital circuit implementation of the embodiment in FIG. 1.

FIG. 4 shows a detailed digital logic implementation of a section of the block diagram in FIG. 1. Features of FIG. 4 that correspond to those in FIG. 1 have been given the same identifying numbers as in FIG. 1. Although FIG. 4 does not show control unit 105 and line counter 100 of FIG. 1, FIG. 4 does indicate that control unit 105 from FIG. 1 may be a microprocessor or microcomputer. Also, FIG. 4 shows exemplary embodiments for counters 115 and 120 and divider 125 in FIG. 1. FIG. 4 also indicates possible digital signal polarities for controlling the counter and comparison functions. Specifically, inverter 430 and register 420 modify signal polarities. A feature of FIG. 4 that is not included in FIG. 1 is field indicator circuit 405 that generates a signal indicating when the current field is field 1. Latch circuits 410 and 415 are controlled by signals from NOR gate 440 and inverter 425, respectively, to aid in interfacing with a microprocessor that may be performing the function of control unit 105 from FIG. 1. Circuit 435 stops counter 115 when the maximum count value is reached to prevent the count value at the output of counter 115 from repetitively cycling through count values. Cycling of counter 115 would undesirably produce multiple transitions on signal VERDEL between pulses on signal VER.

The invention may also be useful in regard to video cassette recorders (VCR). A VCR may incorporate multiple read heads. Periodically, e.g. during vertical blanking, the VCR switches between read heads. The switching operation may introduce a timing transient error into the sync timing. The transient phase error may persist until the end of vertical blanking. In the vicinity of line 21, for example, the timing error may approach 10 μs. The invention may be used as described above to adjust the sync timing and compensate for VCR related phase transients to significantly improve line counter operation.

I claim:

1. Apparatus for processing a video signal having vertical and horizontal display intervals, each of said vertical display intervals including a plurality of said horizontal display intervals, said apparatus comprising:
means for producing a first signal indicating a beginning of each of said vertical display intervals, and a second signal indicating occurrence of said horizontal display intervals, said first signal exhibiting a first delay with respect to said second signal;
means for delaying said first signal by a variable delay determined by a control signal to produce a delayed signal exhibiting a second delay with respect to said second signal, said second delay being subject to change in response to changes in said first delay;
means responsive to said delayed signal and to said second signal for counting said horizontal display intervals occurring during each of said vertical intervals, said counting means tending to count incorrectly when said second delay is in a predetermined range; and
means coupled to said signal producing means and to said delaying means for evaluating said second delay and for generating said control signal to change said second delay to a predetermined delay that substantially prevents said changes in said first delay from causing said second delay to be in said predetermined range.

2. Apparatus according to claim 1, wherein said means for delaying said first signal comprises
a comparator having a first input for receiving said first signal, a second input for receiving said control signal, and an output at which said delayed signal is produced.

3. Apparatus according to claim 1, wherein said means for evaluating said second delay and for generating said control signal comprises a microcomputer.

4. Apparatus according to claim 1, wherein said means for producing said first and second signals comprises:
a counter having a clock input for receiving an input clock signal having a first characteristic frequency, a reset input for receiving a vertical sync signal indicative of said beginning of each of said vertical display intervals, and an output for producing said first signal; and
a frequency divider having an input for receiving said input clock signal and an output for producing said second signal having a second characteristic frequency equal to said first characteristic frequency divided by a factor N, said second characteristic frequency being substantially equal to a frequency of occurrence of said horizontal display intervals.

5. Apparatus according to claim 4, wherein said means for evaluating said second delay and for generating said control signal comprises:
a counter having a clock input for receiving said input clock signal, a reset input for receiving said second signal, and an output for producing an intermediate signal; and
a microcomputer having a first input for receiving said intermediate signal a second input for receiving said delayed signal, and an output for producing said control signal.

6. Apparatus according to claim 1, wherein said predetermined delay is substantially equal to one-quarter of one of said horizontal display intervals.

7. Apparatus according to claim 1, wherein said predetermined delay is substantially equal to three-quarters of one of said horizontal display intervals.

8. Apparatus for processing a video signal having vertical and horizontal display intervals, each of said vertical display intervals including a plurality of said horizontal display intervals, said apparatus comprising:
means for producing a first signal indicating a beginning of each of said vertical display intervals, and a second signal indicating occurrence of said horizontal display intervals, said first signal exhibiting a first delay with respect to said second signal;
means for delaying said first signal by a variable delay determined by a control signal to produce a delayed signal exhibiting a second delay with respect to said second signal; and
means responsive to said delayed signal and to said second signal for evaluating said second delay and for generating said control signal to change said second delay to a predetermined delay.

9. Apparatus according to claim 8 further comprising
means responsive to said delayed signal and to said second signal for counting said horizontal display intervals occurring during each of said vertical intervals;
said counting means tending to count incorrectly when said second delay is in a predetermined range;
said second delay being subject to change in response to a change in said first delay; and
said predetermined delay substantially preventing said changes in said first delay from causing said second delay to be in said predetermined range.

10. Apparatus according to claim 9, wherein said means for delaying said first signal comprises
a comparator having a first input for receiving said first signal, a second input for receiving said control signal, and an output at which said delayed signal is produced.

11. Apparatus according to claim 9, wherein said means for evaluating said second delay and for generating said control signal comprises a microcomputer.

12. Apparatus according to claim 9, wherein said means for producing said first and second signals comprises:
a counter having a clock input for receiving an input clock signal having a first characteristic frequency, a reset input for receiving a vertical sync signal indicative of said beginning of each of said vertical display intervals, and an output for producing said first signal; and a frequency divider having an input for receiving said input clock signal and an output for producing said second signal having a second characteristic frequency equal to said first characteristic frequency divided by a factor N, said second characteristic frequency being substantially equal to a frequency of occurrence of said horizontal display intervals.

13. Apparatus according to claim 12, wherein said means for evaluating said second delay and for generating said control signal comprises:

a counter having a clock input for receiving said input clock signal, a reset input for receiving said second signal, and an output for producing an intermediate signal; and a microcomputer having a first input for receiving said intermediate signal, a second input for receiving said delayed signal, and an output for producing said control signal.

14. Apparatus according to claim 9, wherein said predetermined delay is substantially equal to one-quarter of one of said horizontal display intervals.

15. Apparatus according to claim 9, wherein said predetermined delay is substantially equal to three-quarters of one of said horizontal display intervals.

* * * * *